United States Patent
Barzaghi et al.

(10) Patent No.: US 8,989,816 B2
(45) Date of Patent: Mar. 24, 2015

(54) NODE FOR A RADIO ACCESS NETWORK

(75) Inventors: Giorgio Barzaghi, Grezzago (IT); Fred Davant, Plaisir (FR); Giacomo Mirelli, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/389,495

(22) PCT Filed: Aug. 13, 2010

(86) PCT No.: PCT/EP2010/061845
§ 371 (c)(1),
(2), (4) Date: Feb. 8, 2012

(87) PCT Pub. No.: WO2011/032790
PCT Pub. Date: Mar. 24, 2011

(65) Prior Publication Data
US 2012/0188942 A1    Jul. 26, 2012

(30) Foreign Application Priority Data

Sep. 21, 2009    (EP) .................................... 09305881

(51) Int. Cl.
| | |
|---|---|
| H04M 1/00 | (2006.01) |
| H04W 92/20 | (2009.01) |
| H04W 88/08 | (2009.01) |
| H04W 92/12 | (2009.01) |

(52) U.S. Cl.
CPC ............ *H04W 92/20* (2013.01); *H04W 88/085* (2013.01); *H04W 92/12* (2013.01)
USPC ...................................................... 455/561

(58) Field of Classification Search
None
See application file for complete search history.

(56) References Cited

U.S. PATENT DOCUMENTS

| | | | | |
|---|---|---|---|---|
| 6,963,547 | B1* | 11/2005 | Kwak et al. ................. | 370/310.1 |
| 2002/0049890 | A1* | 4/2002 | Bosisio et al. ................ | 711/146 |
| 2004/0005039 | A1* | 1/2004 | White et al. ................ | 379/93.01 |
| 2004/0141502 | A1* | 7/2004 | Corson et al. .................. | 370/389 |
| 2005/0143131 | A1* | 6/2005 | Gish et al. ...................... | 455/561 |
| 2005/0281216 | A1* | 12/2005 | Varonen et al. ............... | 370/328 |
| 2005/0282586 | A1* | 12/2005 | Rutherford et al. ......... | 455/562.1 |

(Continued)

FOREIGN PATENT DOCUMENTS

| | | |
|---|---|---|
| EP | 1744572 | 1/2007 |
| EP | 1890390 | 2/2008 |

(Continued)

*Primary Examiner* — Hassan Kizou
*Assistant Examiner* — Ashil Farahmand
(74) *Attorney, Agent, or Firm* — Carmen Patti Law Group, LLC

(57) ABSTRACT

It is disclosed a node of a radio access network. The node comprises an access device having a transceiver suitable for exchanging upstream and downstream traffic with a plurality of terminals located in a coverage area thereof, a digital unit suitable for performing base-band processing of the upstream and downstream traffic, and a traffic link connecting the transceiver and the digital unit. The node further comprises a backhauling apparatus having an outdoor unit suitable for exchanging the upstream and downstream traffic with a further node of the radio access network by means of a point-to-point microwave connection. The transceiver is connected to the outdoor unit by means of a backhauling link. The digital unit of the access device and the outdoor unit of the backhauling apparatus are configured to exchange the upstream and downstream traffic through the traffic link, the transceiver and the backhauling link.

15 Claims, 2 Drawing Sheets

(56) References Cited

U.S. PATENT DOCUMENTS

| | | | |
|---|---|---|---|
| 2006/0116171 A1* | 6/2006 | Tiedemann et al. | 455/561 |
| 2007/0133477 A1* | 6/2007 | Ebert et al. | 370/335 |
| 2008/0045234 A1* | 2/2008 | Reed | 455/456.1 |
| 2008/0055058 A1* | 3/2008 | Nishiyama | 340/438 |
| 2008/0181171 A1 | 7/2008 | Koziy et al. | |
| 2009/0085726 A1* | 4/2009 | Radtke | 340/310.17 |
| 2009/0103492 A1* | 4/2009 | Altshuller et al. | 370/331 |
| 2009/0316585 A1* | 12/2009 | Srinivasan et al. | 370/241 |
| 2009/0316610 A1* | 12/2009 | Yellin et al. | 370/281 |
| 2010/0124921 A1* | 5/2010 | Carmon | 455/426.1 |
| 2011/0235615 A1* | 9/2011 | Kalhan | 370/331 |

FOREIGN PATENT DOCUMENTS

| | | |
|---|---|---|
| JP | 2003143050 | 5/2003 |
| JP | 2009094660 | 4/2009 |

* cited by examiner

NODE FOR A RADIO ACCESS NETWORK

FIELD OF THE INVENTION

The present invention relates to the field of radio access networks.

BACKGROUND ART

It is known that a radio access network allows a plurality of users provided with respective terminals (e.g. mobile phones, PDAs, laptop PCs, etc.) to access a number of telephone services and/or data services (such as Internet access, text message services and multimedia message services, e-mail, etc.). Exemplary radio access networks are the GSM (Global System for Mobile communications), the UMTS (Universal Mobile Telecommunications System) and the LTE (Long Term Evolution networks).

A radio access network typically comprises a plurality of network nodes (or simply nodes) and a traffic collection center. For instance, in a GSM radio access network the traffic collection center is termed BSC (Base Station Controller). The nodes and the traffic collection center are connected to each other according to a given topology (e.g. tree or ring) by means of point-to-point wireless connections.

Each node collects traffic from terminals located within its own coverage area (termed "cell") and forwards it to the traffic collection center possibly through other nodes. This type of traffic is generally termed "upstream traffic". On the other hand, each node receives traffic from the traffic collection center, possibly through other nodes, and distributes it to terminals located in its cell. This type of traffic is generally termed "downstream traffic". Nodes located at the edge of a radio access network will be termed herein after "terminal nodes", while all the other nodes of the radio access network will be termed "intermediate nodes".

Each node (either terminal or intermediate) typically comprises an access device for collecting/distributing traffic in the cell and a microwave apparatus (which is generally termed "backhauling apparatus") for implementing the above point-to-point connections with the adjacent nodes. For instance, in a GSM radio access network the access devices are typically called BTS (Base Station Transceiver), while in a LTE radio access network the access devices are typically termed eNodeB (Evolved NodeB).

An access device typically comprises one or more transceivers and a digital unit. For instance, in a eNodeB of an LTE radio access network, the transceivers are termed RRH (Remote Radio Head). The access device may have a "split" architecture, i.e. the transceiver(s) may be located outdoor (e.g. they may be fixed to the upper part of a pylon), while the digital unit may be implemented as a separated indoor unit (e.g. located in a cabinet placed at ground level in proximity of the pylon). The transceiver(s) are typically connected to the digital unit by means of respective links, that are typically implemented as optical fiber links or coaxial links. Further, power supply lines are provided for transferring power supply from the digital unit to the transceiver(s).

A backhauling apparatus typically comprises an outdoor unit comprising one or more microwave transceivers (e.g. fixed to the upper part of a pylon) and an indoor unit (e.g. located in a cabinet placed at ground level in proximity of the pylon). The outdoor unit and the indoor unit are typically connected by means of a link, that is typically implemented as an optical fiber link or a coaxial link. Further, a power supply line is provided for transferring power supply from the indoor unit to the outdoor unit.

The access device of a node is connected to the backhauling apparatus. In particular, the digital unit of the access device typically has a backhauling interface connected to the indoor unit of the backhauling apparatus by means of a backhauling link. Also the backhauling link is typically implemented as an optical fiber link or a coaxial link.

In a terminal node, each transceiver of the access device collects traffic in the form of radio signals from terminals located in the cell, formats such radio signals according to the CPRI (Common Public Radio Interface) standard and transmits them to the digital unit. The digital unit performs baseband conversion of the received signals, and multiplexes them so as to form a single upstream traffic flow. The digital unit then transmits the upstream traffic flow to the indoor unit of the backhauling apparatus, by means of the backhauling interface and the backhauling link. For instance, in case of LTE networks, the backhauling link may support Ethernet at the link layer of the Internet Protocol suite, while it may support IP/IPSec (Internet Protocol Security) and the User Plane and Data Plane protocols of LTE (for instance S1 or X2) at the Internet layer of the Internet Protocol suite.

The indoor unit typically splits the upstream traffic flow in upstream packets (typically, Gigabit Ethernet packets) and, according to a routing table, routes each upstream packet to one of the microwave transceivers of the outdoor unit. It shall be noticed that, in LTE networks where the backhauling link supports Ethernet at the link layer, the upstream traffic flow received at the indoor unit through the backhauling interface is already split in Ethernet packets. The operation of splitting the upstream traffic flow in packets has indeed already been performed by the digital unit of the access device before transmission through the backhauling interface and the backhauling link. The microwave transceivers of the outdoor unit therefore receive upstream packets from the indoor unit and transmit them to backhauling apparatuses of further nodes or to the traffic collection center in the form of microwave signals.

On the other hand, at the terminal node the microwave transceivers of the outdoor unit receive downstream packets (typically, Gigabit Ethernet packets) from backhauling apparatuses of further nodes or from the traffic collection center in the form of microwave signals. The microwave transceivers forward the downstream packets to the indoor unit, that processes the packets for recovering a downstream traffic flow and forwards the downstream traffic flow to the digital unit of the access device by means of the backhauling link and the backhauling interface. The digital unit demultiplexes the downstream traffic flow, thus deriving a number of base-band signals, and converts the base-band signals in corresponding signals formatted according to the CPRI standard. The digital unit then forwards such signals to the transmitter(s), and the transmitter(s) distribute them in the form of radio signals to the terminals located in the cell.

SUMMARY

The inventors have perceived that the above known architecture of a node for a radio access network has some drawbacks.

In particular, the above known architecture disadvantageously comprises several apparatuses and several links and power supply lines connecting the apparatuses. For instance, assuming that the node comprises an access device having two transceivers, two power supply lines and two links are required between the digital unit and each of the transceivers.

A further power supply line and a further link are required between the indoor unit and the outdoor unit of the backhauling apparatus.

Such power supply lines and links considerably increase the CAPEX (CAPital EXpenditure) and the OPEX (Operational expenditure) of the node. Indeed, such power supply lines and links are very expensive to install and maintain, since they are located in an outdoor environment, and accordingly must fulfill very strict requirements in terms of mechanical properties, electrical properties and safety.

Accordingly, the inventors have faced the problem of providing a node for a radio access network that overcomes the aforesaid drawback, i.e. that has a simpler architecture (i.e. it has a reduced number of apparatuses, power supply lines and links) and a reduced CAPEX and OPEX.

According to a first aspect, some embodiments of the present invention provide a node of a radio access network, the node comprising:
- an access device having a transceiver suitable for exchanging upstream traffic and downstream traffic with a plurality of terminals located in a coverage area of the access device, a digital unit suitable for performing base-band processing of the upstream traffic and the downstream traffic, and a traffic link connecting the transceiver and the digital unit; and
- a backhauling apparatus having an outdoor unit suitable for exchanging the upstream traffic and the downstream traffic with a further node of the radio access network by means of a point-to-point microwave connection, wherein the transceiver is connected to the outdoor unit by means of a backhauling link, and wherein the digital unit and the outdoor unit are configured to exchange the upstream traffic and the downstream traffic through the traffic link, the transceiver and the backhauling link.

Preferably, the digital unit is configured to split the upstream traffic in upstream packets and transmit the upstream packets to the outdoor unit through the traffic link, the transceiver and the backhauling link.

Preferably, the outdoor unit is configured to receive the upstream packets and to perform routing functions on the upstream packets.

Preferably, the outdoor unit is configured to receive the downstream traffic from the further node in the form of downstream packets, to perform routing functions on the downstream packets and to forward the downstream packets to the digital unit through the backhauling link, the transceiver and the traffic link.

Preferably, the digital unit is configured to receive the downstream packets and to recover the downstream traffic from the downstream packets.

Preferably, if the digital unit comprises a backhauling interface suitable for directly connecting the digital unit to the backhauling apparatus, the backhauling interface is logically short-circuited.

Preferably, the transceiver comprises a further backhauling interface and the outdoor unit comprises a still further backhauling interface, the backhauling link connecting the further backhauling interface and the still further backhauling interface.

Preferably, the further backhauling interface and the still further backhauling interface are Gigabit Ethernet interfaces.

Preferably, the backhauling link is a fiber optic link or a coaxial link.

Preferably, the access device further comprises a power supply line connecting the digital unit and the transceiver for supplying the transceiver, a branching unit on the power supply line and a further power supply line connecting the branching unit and the outdoor unit for supplying the outdoor unit.

According to a second aspect, some embodiments of the present invention provide a radio access network comprising a node as set forth above.

According to a third aspect, some embodiments of the present invention provide a method for processing upstream traffic at a node of a radio access network, the method comprising:
a) at an access device of said node, collecting upstream traffic from a plurality of terminals located in a coverage area of the access device by means of a transceiver,
b) forwarding the upstream traffic from the transceiver to a digital unit of the access device through a traffic link connecting the transceiver and the digital unit;
c) at the digital unit, performing base-band processing of the upstream traffic;
d) forwarding the upstream traffic from the digital unit to an outdoor unit of a backhauling apparatus of the node, and
e) at the outdoor unit, transmitting the upstream traffic to a further node of the radio access network by means of a point-to-point microwave connection, wherein step d) comprises forwarding the upstream traffic through the traffic link, the transceiver and a backhauling link connecting the transceiver and the outdoor unit.

Preferably, step d) comprises, at the digital unit, splitting the upstream traffic in upstream packets and transmitting them on the traffic link.

According to a fourth aspect, some embodiments of the present invention provides a method for processing downstream traffic at a node of a radio access network, the method comprising:
a') at the outdoor unit of a backhauling apparatus of the node, receiving the downstream traffic from a further node of the radio access network by means of a point-to-point microwave connection;
b') forwarding the downstream traffic from the outdoor unit to a digital unit of an access device of the node,
c') at the digital unit, performing base-band processing of the downstream traffic;
d') forwarding the downstream traffic from the digital unit to a transceiver of the access device through a traffic link connecting the transceiver and the digital unit; and
e') at the access device, distributing the downstream traffic to a plurality of terminals located in a coverage area of the access device by means of the transceiver, wherein step b') comprises forwarding the downstream traffic through a backhauling link connecting the transceiver and the outdoor unit, the transceiver and the traffic link.

Preferably, step b') comprises, at the digital unit, receiving downstream packets and recovering the downstream traffic from the downstream packets.

BRIEF DESCRIPTION OF THE DRAWINGS

The present invention will become clearer by reading the following detailed description, given by way of example and not of limitation, to be read with reference to the accompanying drawings wherein.

DETAILED DESCRIPTION OF PREFERRED EMBODIMENTS OF THE INVENTION

Figure 1:
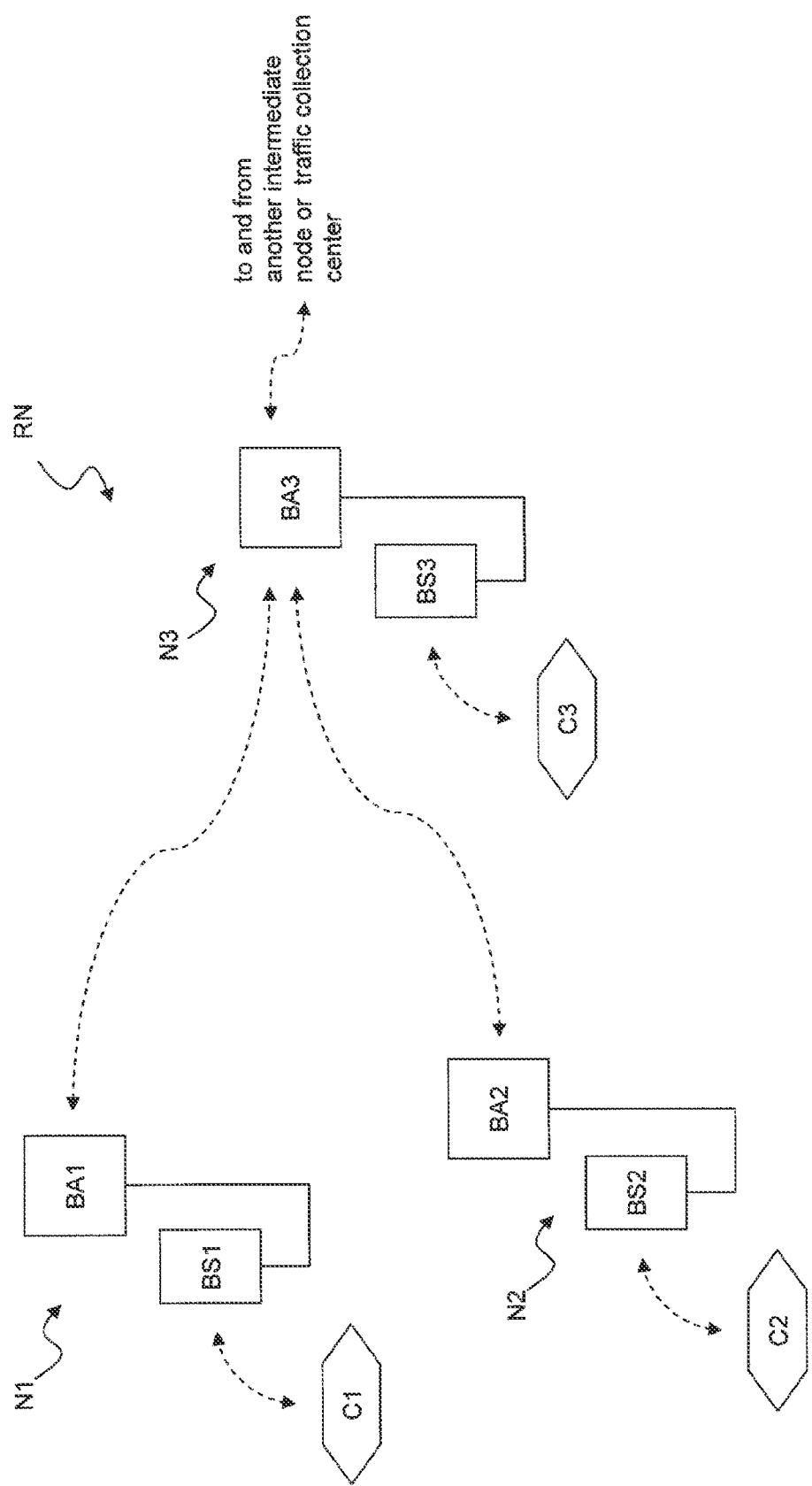
FIG. 1 schematically shows a portion of a radio access network.

FIG. 1 schematically shows a portion of a radio access network RN, comprising two terminal nodes N1, N2 and an intermediate node N3. The radio access network RN may comprise other nodes that, for simplicity, are not shown in FIG. 1. The radio access network RN may be for instance a GSM network, a UMTS network, a LTE network or the like.

Each terminal node N1, N2 comprises a respective access device BS1, BS2 and a respective backhauling apparatus BA1, BA2 connected to the access device BS1, BS2. The intermediate node N3 comprises an access device BS3 and a backhauling apparatus BA3 connected to the access device BS3. This is merely exemplary, since both the terminal nodes N1, N2 and the intermediate node N3 may comprise any number of access devices connected to the backhauling apparatus. In case the radio access network RN is an LTE network, the access devices BS1, BS2 and BS3 are implemented as respective eNodeB.

The terminal nodes N1, N2 and the intermediate node N3 are preferably arranged according to a tree topology. In particular, the terminal node N1 is connected to the intermediate node N3 by means of a point-to-point wireless connection implemented by the backhauling apparatus BA1 and the backhauling apparatus BA3. Similarly, the terminal node N2 is connected to the intermediate node N3 by means of a point-to-point wireless connection implemented by the backhauling apparatus BA2 and the backhauling apparatus BA3. The intermediate node N3 may be connected either to a further intermediate node or to the traffic collection center (not shown in FIG. 1) by means of a point-to-point wireless connection implemented by the backhauling apparatus BA3.

Herein after, the operation of the radio access network RN will be briefly described, by referring only (by way of example) to the upstream direction (i.e. the direction from the terminal nodes towards the traffic collection center).

The terminal node N1 preferably collects upstream traffic from terminals located in a cell C1 by means of its access device BS1 and forwards it to the backhauling apparatus BA1, that transmits it to the backhauling apparatus BA3 of the intermediate node N3. Similarly, terminal node N2 preferably collects upstream traffic from terminals located in a cell C2 by means of its access device BS2 and forwards it to the backhauling apparatus BA2, that transmits it to the backhauling apparatus BA3 of the intermediate node N3.

Besides, the terminal node N3 preferably collects upstream traffic from terminals located in a cell C3 by means of its access device BS3 and forwards it to the backhauling apparatus BA3. The backhauling apparatus BA3 of the intermediate node N3 therefore receives upstream traffic from the access device BS3, from the backhauling apparatus BA1 of the terminal node N1 and from the backhauling apparatus BA2 of the terminal node N2. The backhauling apparatus BA3 then multiplexes the received upstream traffic coming from the various sources, and forwards it towards the traffic collection center, possibly through further intermediate nodes located upstream (not shown in FIG. 1).

Figure 2:
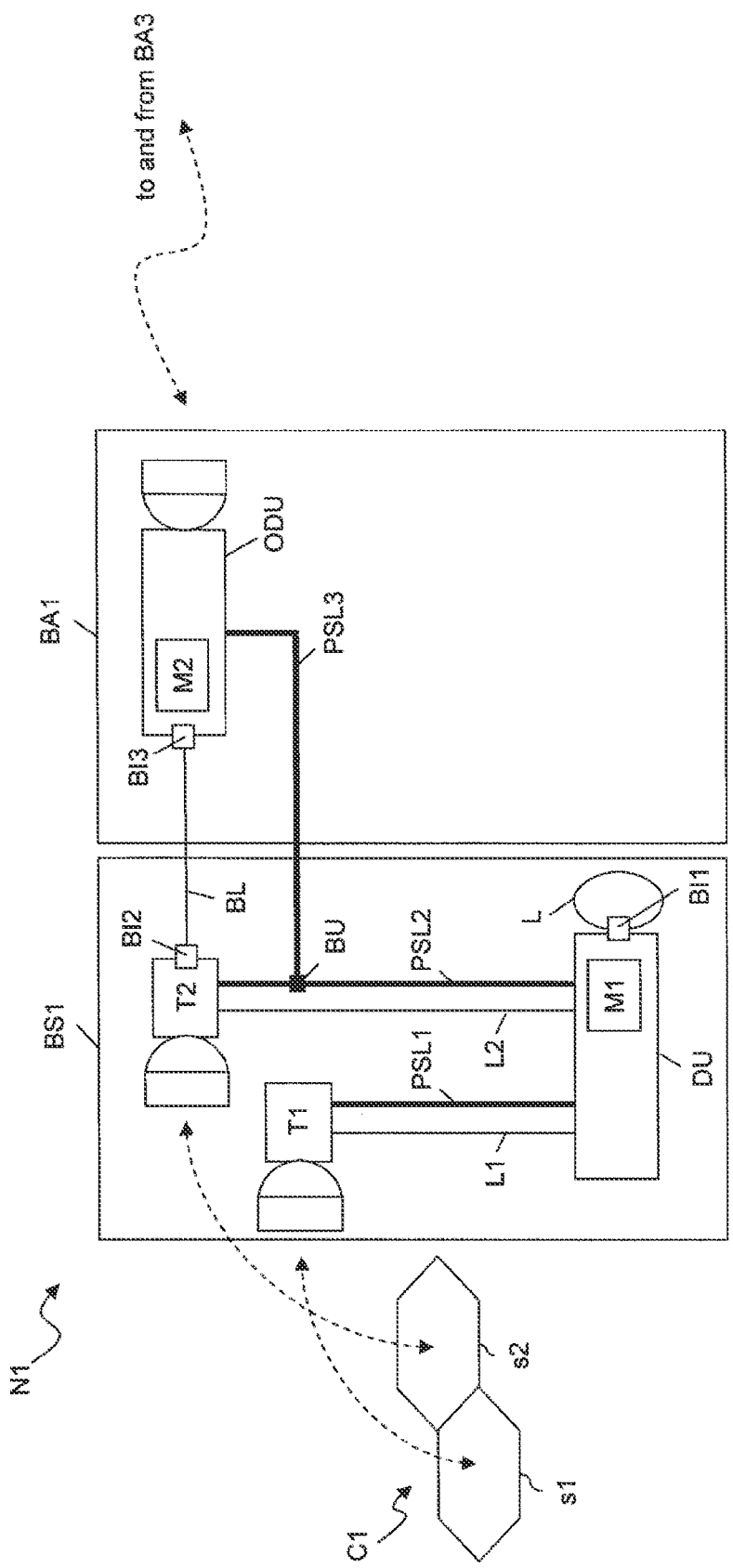
FIG. 2 shows in further detail the structure of a terminal node of the radio access network of FIG. 1, according to a preferred embodiment of the present invention.

The structure of the terminal node N1 will be now described in further detail herein after, by referring to FIG. 2.

As mentioned above, the terminal node N1 preferably comprises an access device BS1 (for instance, an eNodeB, in case the radio access network RN is an LTE network) and a backhauling apparatus BA1 connected to the access device BS1.

The access device BS1 preferably comprises a number of transceivers. By way of example, it is assumed that the access device BS1 comprises two transceivers T1, T2. Each transceiver T1, T2 is preferably configured to exchange traffic in the form of radio signals with terminals located in a respective sector s1, s2 of the above mentioned cell C1. According to preferred embodiments of the present invention, one of the transceiver(s) of the access device BS1 is provided with a backhauling interface allowing connection of the transceiver with the backhauling apparatus BA1. By way of example, in the access device BS1 of FIG. 2 it is assumed that the transceiver T2 is provided with a backhauling interface BI2 allowing connection of the transceiver T2 to the backhauling apparatus BA1. Preferably, the backhauling interface BI2 is a Gigabit Ethernet interface.

Besides, the access device BS1 preferably comprises a digital unit DU. The digital unit DU is preferably configured to perform base-band processing on base-band signals associated to the radio signals exchanged by the transceiver(s) T1, T2. The digital unit DU further preferably comprises an additional indoor module M1, whose role will be described in detail herein after. As mentioned above, a known digital unit is typically provided with a backhauling interface connecting the digital unit to the indoor unit of a backhauling apparatus. According to preferred embodiments of the present invention, in case the digital unit DU comprises a backhauling interface BI1, such backhauling interface BI1 does not connect the digital unit DU to the backhauling apparatus BA1. In other words, the backhauling interface BI1 is logically short-circuited, as symbolically indicated by the loop L in FIG. 2.

The access device BS1 preferably comprises two traffic links L1, L2 connecting the digital unit DU to the transceivers T1 and T2, respectively. The traffic links L1, L2 are suitable for supporting exchange of traffic between the transceivers T1, T2 and the digital unit DU. The traffic links L1, L2 may be implemented as optical fiber links or coaxial links. Traffic between the transceivers T1, T2 and the digital unit DU is preferably exchanged on the traffic links L1, L2 according to the CPRI (Common Public Radio Interface) standard.

The access device BS1 further preferably comprises two power supply lines PSL1 and PSL2 connecting the digital unit DU to the transceivers T1 and T2, respectively. The power supply lines PSL1 and PSL2 are suitable for transferring power supply from the digital unit DU to the transceivers T1 and T2, respectively.

According to preferred embodiments of the present invention, the backhauling apparatus BA1 of the terminal node N1 comprises an outdoor unit ODU provided with a microwave transceiver suitable for implementing the point-to-point wireless connection with the backhauling apparatus BA3 of the intermediate node N3, as shown in FIG. 1. Further, preferably, the outdoor unit ODU comprises an additional outdoor module M2, whose role will be explained in further detail herein after. Preferably, the outdoor unit ODU is provided with a backhauling interface BI3 of the same type as the backhauling interface BI2 of the transceiver T2. Preferably, the backhauling interface BI3 is a Gigabit Ethernet interface.

The terminal node N1 further comprises a backhauling link BL connecting the backhauling interface BI2 of the transceiver T2 with the backhauling interface BI3 of the outdoor unit ODU. Preferably, the backhauling link BL is a Gigabit Ethernet link.

The access device BS1 further preferably comprises a branching unit BU on the power supply line PSL2 connecting the digital unit DU and the transceiver T2. Further, the terminal node N1 preferably comprises a power supply line PSL3 connecting the branching unit BU and the outdoor unit ODU. This advantageously allows transferring power supply from the digital unit DU of the access device BS1 to the outdoor unit ODU of the backhauling apparatus BA1.

Herein after, the operation of the terminal node N1 according to a preferred embodiment of the present invention will be described in detail. By way of example, the operation will be described with reference to the upstream direction only.

Preferably, the transceivers T1 and T2 collect traffic in the form of radio signals from terminals located in the sectors s1 and s2 of the cell C1, respectively. Herein after, for simplicity, the radio signals collected by the transceiver T1 will be indicated as rs1, and the radio signals collected by the transceiver T2 will be indicated as rs2. The transceivers T1, T2 preferably format such radio signals rs1, rs2 according to the CPRI (Common Public Radio Interface) standard and transmits them to the digital unit DU through the traffic links L1, L2, respectively, by using the above mentioned CPRI standard. The digital unit DU preferably performs base-band conversion of the radio signals rs1, rs2, thus deriving corresponding base-band signals bb1, bb2. The digital unit DU then preferably multiplexes the base-band signals bb1, bb2 so as to form a single upstream traffic flow F.

Then, according to preferred embodiments of the present invention, the digital unit DU forwards the upstream traffic flow F to the transceiver T2 by means of the traffic link L2.

More particularly, after base-band conversion and multiplexing, the digital unit DU preferably forwards the upstream traffic flow to the backhauling interface BI1. However, as mentioned above, the backhauling interface BI1 is logically short-circuited, so that the upstream traffic flow F is received at the additional indoor module M1. Preferably, the additional indoor module M1 splits the upstream traffic flow F in upstream packets P. The upstream packets P are preferably Gigabit Ethernet packets. Then, the additional indoor module M1 preferably transmits the upstream packets P to the transceiver T2 along the traffic link L2, by preferably using the CPRI standard.

Therefore, according to embodiments of the present invention, in the direction from the digital unit DU to the transceiver T2 the traffic link L2 supports transmission of two different types of data: the radio signals transporting traffic to be distributed by the transceiver T2 to the terminals located in the sector s2 of the cell C1 and the upstream packets P generated by the additional indoor module M1 at the digital unit DU. It shall be noticed that also the radio signals transporting traffic to be distributed by the transceiver T2 are preferably formatted in packets. Indeed, formatting such radio signals according to the CPRI standard for transmission over the traffic link L2 typically requires using packets, optionally Ethernet packets. Preferably, the transceiver T2 is configured to distinguish packets carrying traffic to be distributed by the transceiver T2 from the upstream packets P generated by the additional indoor module M1 at the digital unit DU by reading the MAC address and the EtherType field of such packets.

At the transceiver T2, the backhauling interface BI2 preferably identifies the upstream packets P among the data received through the traffic link L2, and forwards them to the outdoor unit ODU by means of the backhauling interface BI2, the backhauling link BL and the backhauling interface BI3.

At the outdoor unit ODU, the upstream packets P are received by the additional outdoor module M2. The additional outdoor module M2 is preferably configured to perform routing of the upstream packets P. In the exemplary network portion of FIG. 1, it has been assumed that the terminal node N1 is connected only to the intermediate node N3, and accordingly its outdoor unit ODU has single microwave transceiver implementing the point-to-point wireless connection with the backhauling apparatus BA3 of the intermediate node N3. In this case, routing the upstream packets P therefore merely consists in forwarding the upstream packets P to the single microwave transceiver of the outdoor unit ODU. The microwave transceiver then forwards the upstream packets P to the backhauling apparatus BA3 of the intermediate node N3 in the form of a microwave signal.

However, in a more general situation, the terminal node N1 may be connected to a number of intermediate nodes. In such case, the outdoor unit ODU of the terminal node N1 preferably comprises a number of microwave transceivers, each implementing a point-to-point wireless connection with a respective intermediate node. In this case, the routing function performed by the additional outdoor module M2 consists in consulting a routing table and, base on the information stored in the routing table, forwarding each upstream packet P to one of the microwave transceivers of the outdoor unit ODU.

The downstream traffic processing is symmetric to the above described upstream traffic processing. The downstream traffic processing will be therefore only briefly summarized, while a detailed description will not be repeated.

At the terminal node N1, the outdoor unit ODU of the backhauling apparatus BA1 receives downstream packets (preferably, Gigabit packets) from the backhauling apparatus BA3 of the intermediate node N3. The downstream packets are processed by the additional outdoor module M2 and then forwarded to the transceiver T2, through the backhauling interface BI3 of the outdoor unit ODU, the backhauling link BL and the backhauling interface BI2 of the transceiver T2. The transceiver T2 preferably forwards the downstream packets to the digital unit DU through the traffic link L2, preferably based on the CPRI standard. Therefore, according to embodiments of the present invention, in the direction from the transceiver T2 to the digital unit DU the traffic link L2 supports transmission of two different types of data: the radio signals transporting traffic collected by the transceiver T2 from the terminals located in the sector s2 of the cell C1 and the downstream packets coming from the outdoor unit ODU. Again, also the radio signals transporting traffic collected by the transceiver T2 are preferably formatted in packets. Preferably, the digital unit DU is configured to distinguish packets carrying traffic collected by the transceiver T2 from downstream packets coming from the outdoor unit ODU by reading the MAC address and the EtherType field of such packets. At the digital unit DU, the additional indoor module M1 preferably processes the downstream packets for recovering a downstream traffic flow. Then, the digital unit DU demultiplexes the downstream traffic flow, thus deriving a number of base-band signals, and converts the base-band signals in corresponding signals formatted according to the CPRI standard. The digital unit DU then forwards such signals to the transmitters T1, T2, and the transmitters T1, T2 distribute them in the form of radio signals to the terminals located in the sectors s1, s2 of the cell C1.

The terminal node N1 has a number of advantages.

First of all, in the terminal node N1 the functions that are currently performed by known indoor units (i.e. splitting the local traffic flows in packets of a single format and routing such packets) are distributed in the indoor additional module M1 that is integrated in the digital unit DU of the access device BS1, and in the outdoor additional module M2, that is integrated in the outdoor unit ODU of the backhauling apparatus. This advantageously allows providing a "full outdoor" backhauling apparatus having no indoor unit. The structure of the backhauling apparatus (and, accordingly, of the whole node) is therefore much simpler, in particular at the ground level. Indeed, instead of providing two cabinets (one for the digital unit and one for the indoor unit), only a single cabinet for the digital unit is required, thus allowing reduction of the "footprint" of the node. The node is therefore more compact, and accordingly has a lower environment impact.

Moreover, also the number of links and power supply lines is advantageously reduced. Indeed, the backhauling apparatus does not need any dedicated link or power supply line running from the ground level to the location of the outdoor unit, since it uses part of the resources available at the links and power supply lines of the access device. In other words, redundancy of the resources at the node is reduced by exploiting the resources available at the access device in a more efficient way. Avoiding a dedicated link and power supply line in the backhauling apparatus advantageously allows consistently reducing OPEX and CAPEX of the node, since (as mentioned above) such link and power supply line are very expensive to install and maintain.

Therefore, advantageously, the terminal node N1 has a structure much simpler and compact than known nodes, and has a reduced CAPEX and OPEX.

The invention claimed is:

1. A node of a radio access network, said node comprising:
an access device having a transceiver suitable for exchanging upstream traffic and downstream traffic with a plurality of terminals located in a coverage area of said access device, a digital unit suitable for performing base-band processing of said upstream traffic and said downstream traffic, and a traffic link connecting said transceiver and said digital unit; and
a backhauling apparatus having an outdoor unit suitable for exchanging said upstream traffic and said downstream traffic with a further node of said radio access network by means of a point-to-point microwave connection;
wherein said transceiver is connected to said outdoor unit by means of a backhauling link; and
wherein said digital unit is configured to exchange said upstream traffic and said downstream traffic with said outdoor unit through said traffic link, said transceiver and said backhauling link; and
wherein said digital unit comprises a backhauling interface suitable for directly connecting said digital unit to said backhauling apparatus, and wherein said digital unit is configured to short-circuit said backhauling interface so that said upstream traffic is received at a component of said digital unit for processing.

2. The node according to claim 1, wherein said digital unit is configured to split said upstream traffic in upstream packets and transmit said upstream packets to said outdoor unit through said traffic link, said transceiver and said backhauling link.

3. The node according to claim 2, wherein said outdoor unit is configured to receive said upstream packets and to perform routing functions on said upstream packets.

4. The node according to claim 3, wherein said outdoor unit is configured to
receive said downstream traffic from said further node in the form of downstream packets,
perform routing functions on said downstream packets, and
forward said downstream packets to said digital unit through said backhauling link, said transceiver and said traffic link.

5. The node according to claim 4, wherein said digital unit is configured to receive said downstream packets and to recover said downstream traffic from said downstream packets.

6. The node according to claim 1, wherein said transceiver comprises a further backhauling interface and said outdoor unit comprises a still further backhauling interface, said backhauling link connecting said further backhauling interface and said still further backhauling interface.

7. The node according to claim 6, wherein said further backhauling interface and said still further backhauling interface are Gigabit Ethernet interfaces.

8. The node according to claim 6, wherein said backhauling link is a fiber optic link or a coaxial link.

9. The node according to claim 1, wherein said access device further comprises:
a power supply line connecting said digital unit and said transceiver for supplying said transceiver,
a branching unit on said power supply line, and
a further power supply line connecting said branching unit and said outdoor unit for supplying said outdoor unit.

10. The node according to claim 1, wherein said traffic link is a fiber optic link or a coaxial link.

11. A radio access network comprising a node, said node comprising:
an access device having a transceiver suitable for exchanging upstream traffic and downstream traffic with a plurality of terminals located in a coverage area of said access device, a digital unit suitable for performing base-band processing of said upstream traffic and said downstream traffic, and a traffic link connecting said transceiver and said digital unit; and
a backhauling apparatus having an outdoor unit suitable for exchanging said upstream traffic and said downstream traffic with a further node of said radio access network by means of a point-to-point microwave connection;
wherein said transceiver is connected to said outdoor unit by means of a backhauling link; and
wherein said digital unit is configured to exchange said upstream traffic and said downstream traffic with said outdoor unit through said traffic link, said transceiver and said backhauling link; and
wherein said digital unit comprises a backhauling interface suitable for directly connecting said digital unit to said backhauling apparatus, and wherein said digital unit is configured to short-circuit said backhauling interface so that said upstream traffic is received at a component of said digital unit for processing.

12. A method for processing upstream traffic at a node of a radio access network, said method comprising the steps of:
a) collecting, at an access device of said node, upstream traffic from a plurality of terminals located in a coverage area of said access device by means of a transceiver;
b) forwarding said upstream traffic from said transceiver to a digital unit of said access device through a traffic link connecting said transceiver and said digital unit;
c) performing, at said digital unit, base-band processing of said upstream traffic;
d) forwarding said upstream traffic from said digital unit to an outdoor unit of a backhauling apparatus of said node through said traffic link, said transceiver and a backhauling link connecting said transceiver and said outdoor unit; and
e) transmitting, at said outdoor unit, said upstream traffic to a further node of said radio access network by means of a point-to-point microwave connection;
wherein said digital unit comprises a backhauling interface suitable for directly connecting said digital unit to said backhauling apparatus, and wherein said digital unit is configured to short-circuit said backhauling interface so that said upstream traffic is received at a component of said digital unit for processing.

13. The method according to claim 12, wherein said step d) comprises splitting, at said digital unit, said upstream traffic in upstream packets and transmitting them on said traffic link.

14. A method for processing downstream traffic at a node of a radio access network, said method comprising the steps of:
- a') receiving, at an outdoor unit of a backhauling apparatus of said node, said downstream traffic from a further node of said radio access network by means of a point-to-point microwave connection;
- b') forwarding said downstream traffic from said outdoor unit to a digital unit of an access device of said node through a backhauling link connecting a transceiver and said outdoor unit, said transceiver and a traffic link;
- c') performing, at said digital unit, base-band processing of said downstream traffic;
- d') forwarding said downstream traffic from said digital unit to said transceiver of said access device through said traffic link connecting said transceiver and said digital unit; and
- e') distributing, at said access device, said downstream traffic to a plurality of terminals located in a coverage area of said access device by means of said transceivers, wherein said digital unit comprises a backhauling interface suitable for directly connecting said digital unit to said backhauling apparatus, and wherein said digital unit is configured to short-circuit said backhauling interface so that said downstream traffic is received at a component of said digital unit for processing.

15. The method according to claim 14, wherein said step b') comprises receiving, at said digital unit, downstream packets and recovering said downstream traffic from said downstream packets.

* * * * *